Figure 1:
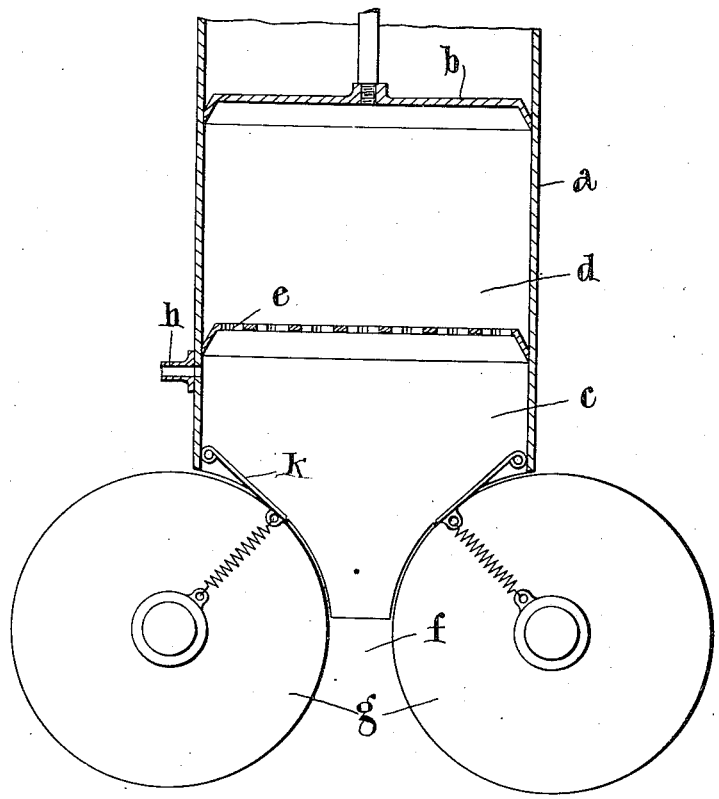

M. A. ADAM.
AERATION OF DOUGH.
APPLICATION FILED JUNE 18, 1910.

1,017,361.

Patented Feb. 13, 1912.

Attest.
Bent. M. Stahl.
Edward N. Saxton.

Inventor
Matthew A. Adam
by Spear, Middleton, Donaldson & Spear
Attys.

UNITED STATES PATENT OFFICE.

MATTHEW ATKINSON ADAM, OF LONDON, ENGLAND.

AERATION OF DOUGH.

1,017,361.   Specification of Letters Patent.   Patented Feb. 13, 1912.

Application filed June 18, 1910. Serial No. 567,731.

*To all whom it may concern:*

Be it known that I, MATTHEW ATKINSON ADAM, a subject of the King of Great Britain and Ireland, residing at 18 Southampton Buildings, Chancery Lane, London, W. C., England, have invented certain new and useful Improvements in and Relating to the Aeration of Dough, of which the following is a specification.

This invention relates to the treatment of dough for the manufacture of bread after its formation in the mixer, and has for its object to provide a method and means for effecting a thorough and complete permeation of the dough mass with a suitable free oxygen containing gas.

It is known that if dough be subjected to a thorough and complete aeration after the lapse of a part of the period of fermentation marked benefits accrue; the baked products of dough so treated are both whiter in color and of greater volume than dough produced by ordinary methods.

It has been proposed to make dough for fermented bread by repeatedly drawing out or shredding the mass into sheets or membranes and when these become highly tenacious folding them one upon another thereby confining air between them and recombining them with the main dough mass whereby the entire mass is said to become aerated. The air to which the dough was exposed was at atmospheric pressure.

For the purpose of aerating dough however only a process in which, as described in Lunt's British Patent No. 24127/07, gas under pressure is caused to effect a stretching of the dough in the presence of the gas and in which means are provided for preventing the escape of the gas without effecting such stretching has been found to effect the desired result.

The majority of the known processes attempted to effect aeration by means of holes in the mixer walls or perforated pipes within the mixer through which air was introduced, but owing to the high surface tension and great tenacity of the dough the air bubbles introduced by a series of perforations below the dough mass coalesced and escaped and no substantial stretching or permeation of the dough resulted. In the process referred to, however, in which the stretching and aeration have been successfully accomplished this has been effected by introducing a suitable gas into the dough by means of automatically throttled gas introducing elements which deliver gas only when they are immersed in and sealed by the dough. I have found, however, that the beneficial results obtained by treating dough according to the above method may be produced in a different manner, which constitutes the present invention.

This invention consists in the treatment of dough for the purpose referred to by exposing the same in a thin sheet or in thin sheets, threads or the like, to oxygen, air or other suitable gas containing free oxygen under pressure, and recombining the dough while still under the gaseous pressure.

This invention also consists in thoroughly permeating dough with oxygen air or other suitable gas containing free oxygen after the lapse of a part of the period of fermentation by causing substantially every part of the dough mass to be exposed in a membranous filiform or other suitable condition, of fine division to the gas under pressure by forcing the dough mass through and or against dividing means into contact with the said gas under pressure and recombining the divided dough mass before issuing from this gaseous atmosphere.

This invention also consists in forcing dough through a series of apertures into a closed substantially gas tight receptacle into which is passed oxygen air or a suitable free oxygen containing gas under pressure and recombining the dough by causing it to issue from the receptacle between rollers or the like forming or placed about the exit from this receptacle.

The present invention further consists in the improvements in dough manufacture hereinafter described.

A frame or apparatus for carrying out my invention is illustrated in the accompanying drawings, in which—

Figure 2:
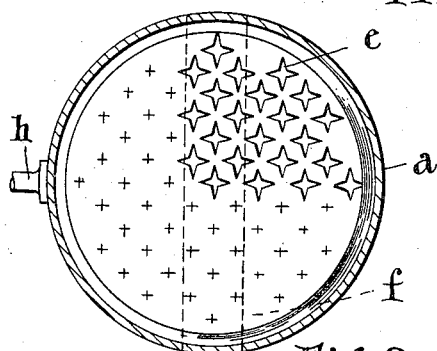

Figure 1 is a vertical sectional elevation; and Fig. 2 is a horizontal section of the apparatus.

In carrying out my invention according to one form, which is diagrammatically indicated in Figs. 1 and 2, I provide a vertical cylindrical vessel, $a$, having a piston, $b$, at its upper end adapted to travel within the cylinder, $a$, and having at its lower end an extension of a suitable shape forming a chamber, $c$, into which dough may be expressed from the cylinder, $a$, in which it has previously been placed. This chamber is separated from the cylinder by a plate or the like $d$, perforated by a considerable number of holes such as those indicated at $e$. It is of course understood that this is merely an example of the dividing means which may be employed.

At the lower extremity of the chamber $c$, and forming an exit, $f$, from the chamber is provided a pair of parallel rollers, $g$. One or more gas inlets to the chamber as at $h$, and suitable means for preventing gas losses as at $k$, are provided.

Fig. 2 diagrammatically indicates the position and size of the exit $f$ relatively to the dividing means.

The method of operation is briefly as follows:—Dough previously formed in a mixer and which has been allowed to stand for a part, say for a quarter of its period of fermentation, is then placed within the cylinder, $a$, in any convenient way, and is gradually expressed therefrom by the piston, $b$, through the plurality of perforations $e$ into the chamber $c$. By this means the dough is divided into a series of long thin strips and substantially every part of the same is fully exposed to the action of an oxygen containing gas as for example air which is forced in at $h$ in to the chamber $c$. These strips accumulating within the chamber at the lower end and resting on the roller surfaces are forced out by the pressure of the gas in the chamber through the rollers rotated at the desired and suitable speed, which recombine it and therefore have the effect both of insuring that all the gas shall be rolled into the dough, under pressure, and shall by its expansion on emergence from the apparatus more or less stretch the dough, and of keeping up the necessary back pressure of dough within the chamber.

It will be understood that the particular conformation, size and number of the dough dividing perforations, is described merely by way of example, and that the same may be varied as desired.

Various modified forms of apparatus may easily be devised which will carry into effect the process of my invention which is to expose every part of the dough as by division of it after a part of its fermentation period has elapsed into thin sheets, threads or the like to an oxygen containing gas under pressure and to recombine the subdivided dough in such a manner as to insure the retention within the dough of a maximum quantity of the gas.

As is well known a suitable and advantageous period for treating the dough is after the lapse of one quarter or a greater portion of the usual time of fermentation. If for example, the interval in time between the mixing of the dough and the placing of the latter in the oven be about four hours the process is advantageously applied to the dough one hour or more after the latter has been mixed, and the best results are usually obtained by applying the process after about three hours from mixing. It is also desirable to allow the dough to ferment for a certain time, say, at least half an hour after the last treatment with air or gas before placing it in the oven so that the dough which may have suffered a temporary decrease in volume may regain its former size and the full increase in volume of the bread be realized.

It will be seen that whereas in the known process referred to above the opening out of the dough and its stretching have been described as effected by the high pressure gas used for the aeration, in my present process the dough is divided and opened out for exposure to the influence of the oxygenated gas under pressure by mechanical means independent of the gas itself, the inclosed gas effecting its stretching at a later period.

Having now described my invention, what I claim as new and desire to secure by Letters Patent is:—

1. A process of dough treatment consisting in subdividing the dough exposing it to a suitable free oxygen containing gas under pressure and recombining the dough while still under gaseous pressure; as set forth.

2. A process of dough treatment consisting in subdividing dough in an atmosphere of a suitable free oxygen containing gas under pressure and recombining the dough before removal from this atmosphere; as set forth.

3. A process of dough treatment consisting in exposing dough in filiform subdivision to a suitable free oxygen containing gas under pressure and recombining the thread-like parts while still in the atmosphere; as set forth.

4. A process for the aeration of dough in which the aeration is commenced after the lapse of a part of the period of fermentation and is effected by exposing the dough in suitable subdivision to a suitable free oxygen containing gas under pressure and recombining the parts of the dough while still under gaseous pressure; as set forth.

5. Process for the aeration of dough, in which the aeration, commenced after the lapse of a part of its period of fermentation, is carried out by positively forcing the dough into contact with dividing means, exposing the divided dough to a suitable free oxygen containing gas under pressure and positively recombining the parts of the dough while still under the gaseous pressure; as set forth.

6. Process for the aeration of dough in which the treatment of the dough is commenced after a quarter of its period of fermentation the dough being forced positively against a dividing means and the divided parts then exposed to a suitable free oxygen containing gas under pressure and recombined while still under a gaseous pressure; as set forth.

7. A process for the treatment of dough in which the greater portion of the same is exposed to the action of a suitable free oxygen containing gas under pressure by increasing its surface mechanically, subjecting this increased surface to the action of the gas and then decreasing the surface of the dough while the same is still under the action of the gas as set forth.

8. A process for the treatment of dough, in which the dough mass is mechanically opened out, exposed to the action of a suitable free oxygen containing gas under pressure, and re-combined while the gas in contact with the dough is still under pressure, as set forth.

9. A process for the treatment of dough, in which the greater portion of the same is exposed to the action of a suitable free oxygen containing gas under pressure by increasing its surface mechanically, and subjecting this increased surface to the action of the gas, as set forth.

10. A process for the treatment of dough, in which the dough mass is mechanically opened out, exposed to the action of a suitable free oxygen containing gas under pressure, and re-combined while the gas in contact with the dough is still under pressure, the process being commenced after the lapse of a part of the fermentation period of the dough, as set forth.

11. A process for the treatment of dough, in which the greater portion of the same is exposed to the action of a suitable free oxygen containing gas under pressure by increasing its surface mechanically, and subjecting this increased surface to the action of the gas, the process being commenced after the lapse of a part of the fermentation period of the dough, as set forth.

In testimony whereof, I affix my signature in presence of two witnesses.

M. ATKINSON ADAM.

Witnesses:
 BERTRAM H. MATTHEWS,
 REGINALD W. ANIS.